United States Patent [19]

McCown et al.

[11] Patent Number: 4,468,993
[45] Date of Patent: Sep. 4, 1984

[54] SMALL LOG BUCKING SYSTEM

[75] Inventors: Jack R. McCown, Lake Oswego; J. Rogers Firth, Portland, both of Oreg.

[73] Assignee: International Paper Company, New York, N.Y.

[21] Appl. No.: 387,658

[22] Filed: Jun. 11, 1982

[51] Int. Cl.³ .............................................. B26D 7/06
[52] U.S. Cl. ........................................ 83/112; 83/157; 83/363; 83/418; 83/471.1; 83/522
[58] Field of Search ................ 83/520, 522, 928, 418, 83/371, 414, 364, 474, 490, 471.1, 104, 437, 435.1, 425.1, 425.2, 157, 566; 144/379, 356, 357, 193 D, 3 K; 198/774, 775; 414/748, 745

[56] References Cited

U.S. PATENT DOCUMENTS

| | | | |
|---|---|---|---|
| 351,144 | 10/1886 | Williams | 414/748 |
| 497,098 | 5/1893 | Kelly | 414/748 |
| 2,206,156 | 7/1940 | Bogart | 198/775 |
| 2,806,492 | 9/1957 | Becker | 83/520 |
| 2,863,476 | 12/1958 | Clark | 144/162 R |
| 3,101,755 | 8/1963 | Stupfel et al. | 83/102 |
| 3,304,971 | 2/1967 | Pease | 144/312 |
| 3,329,181 | 7/1967 | Buss et al. | 83/84 |
| 3,381,729 | 5/1968 | Dunn et al. | 144/312 |
| 3,459,246 | 8/1969 | Ottosson | 83/808 |
| 3,502,123 | 3/1970 | Golick et al. | 144/312 |
| 3,513,321 | 5/1970 | Sherman | 250/219 |
| 3,566,936 | 3/1971 | Golick et al. | 144/312 |
| 3,658,103 | 4/1972 | Gilbert | 144/162 R |
| 3,736,968 | 6/1973 | Mason | 144/357 |
| 3,750,727 | 8/1973 | Ord | 144/312 |
| 3,812,951 | 5/1974 | Fullaway | 83/102 |
| 3,841,461 | 10/1974 | Henderson et al. | 198/30 |
| 3,852,579 | 12/1974 | Sohn et al. | 235/151.3 |
| 3,856,061 | 12/1974 | Miles | 144/312 |
| 3,885,483 | 5/1975 | Ikeya et al. | 83/365 |
| 3,890,509 | 6/1975 | Maxey | 250/561 |
| 3,897,156 | 7/1975 | Chasson | 356/157 |
| 3,937,114 | 2/1976 | Joensson et al. | 83/425 |
| 3,941,019 | 3/1976 | Baldwin et al. | 83/71 |
| 3,963,938 | 6/1976 | Sanglert | 250/561 |
| 3,970,128 | 7/1976 | Kohlberg | 144/245 |
| 3,983,403 | 9/1976 | Dahlström et al. | 250/560 |
| 4,031,790 | 6/1977 | Arvidsson | 83/425 |
| 4,068,695 | 1/1978 | Seaman | 144/312 |
| 4,139,035 | 2/1979 | Bystedt | 144/312 |
| 4,149,089 | 4/1979 | Idelsohn et al. | 250/563 |
| 4,152,960 | 5/1979 | Detjen | 83/435 |
| 4,164,248 | 8/1979 | Rysti | 144/312 |
| 4,186,310 | 1/1980 | Maxey | 250/561 |
| 4,188,544 | 2/1980 | Chasson | 250/560 |
| 4,195,346 | 3/1980 | Schroder | 364/475 |
| 4,196,648 | 4/1980 | Jones et al. | 83/365 |
| 4,294,295 | 10/1981 | Olin | 144/3 K |
| 4,331,052 | 5/1982 | Neff | 83/157 |
| 4,383,604 | 5/1983 | Grandemange | 198/775 |

FOREIGN PATENT DOCUMENTS 2350988 4/1975 Fed. Rep. of Germany.
2912163 10/1979 Fed. Rep. of Germany.
1418201 12/1975 United Kingdom.

Primary Examiner—James M. Meister
Assistant Examiner—J. L. Knoble
Attorney, Agent, or Firm—Charles B. Smith; James M. Williams

[57] ABSTRACT

A bucking station for small logs is disclosed, in which a log is scanned to determine its size and shape, the resulting data are analyzed by a computer which determines the optimum locations for cuts, and the proposed cut locations are displayed on the log optically for the operator's inspection. If the operator overrides any of the proposed cuts, the computer recalculates any cuts not specified by the operator. When all cuts have been approved, the log is kicked to a cutting bed, where the cuts are made by means of two independently controllable traveling saws. The cutting bed is preferably defined by three sets of parallel plates. The first set comprises stationary plates having V-shaped upper edges which define a V-shaped trough in which the log is initially received. The second and third sets of plates are vertically movable and, when raised, together define a second V-shaped trough located above the first trough. After the log is received in the first trough, the movable plates are raised to elevate the log to the second trough, where it is cut. After each cut is made, the movable plates supporting the downstream side of the cut-off segment are lowered to allow the segment to roll onto an output conveyor, which carries it to the next work station. In this manner the segments are automatically singulated without a separate singulating station.

11 Claims, 3 Drawing Figures

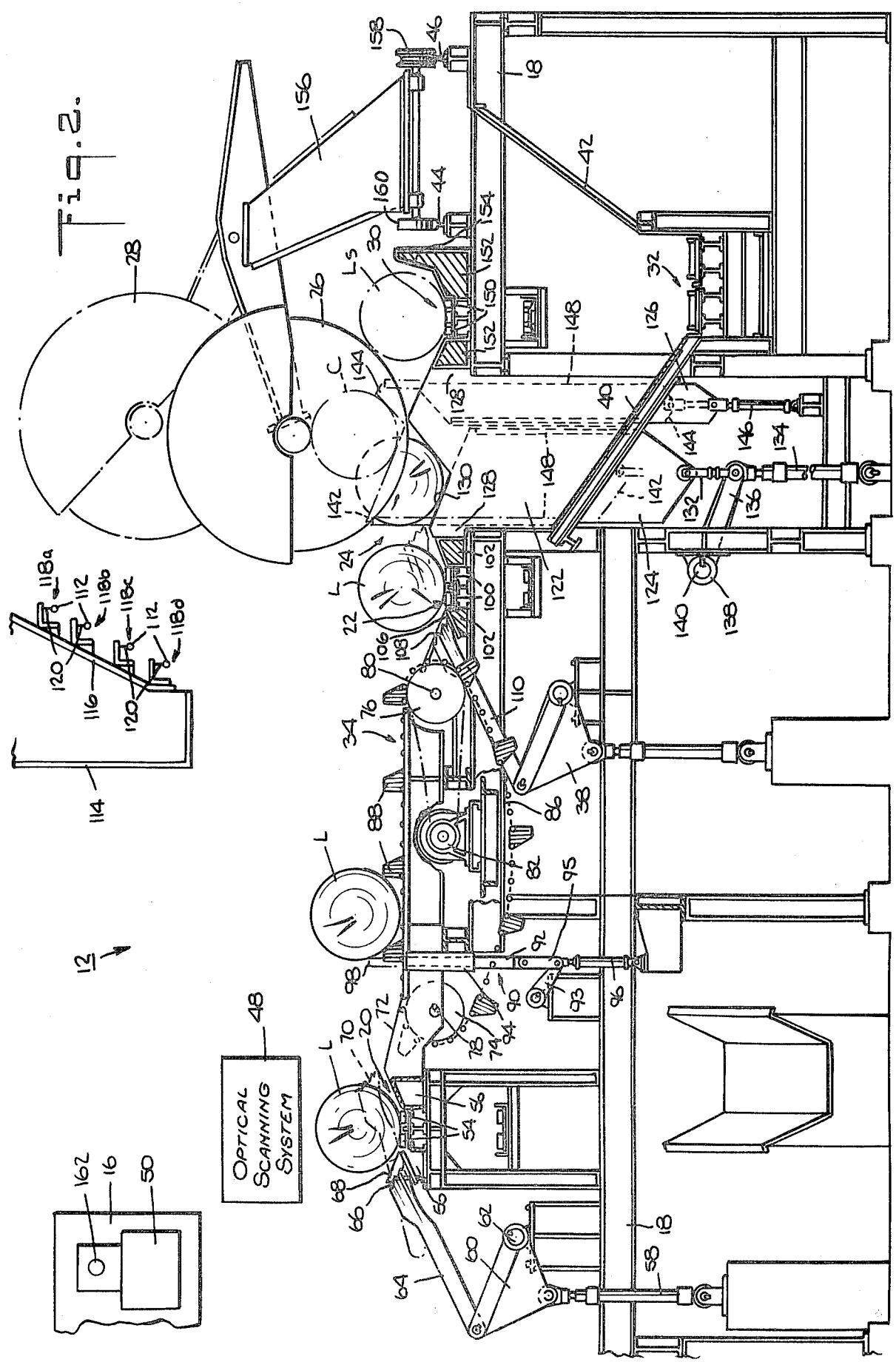

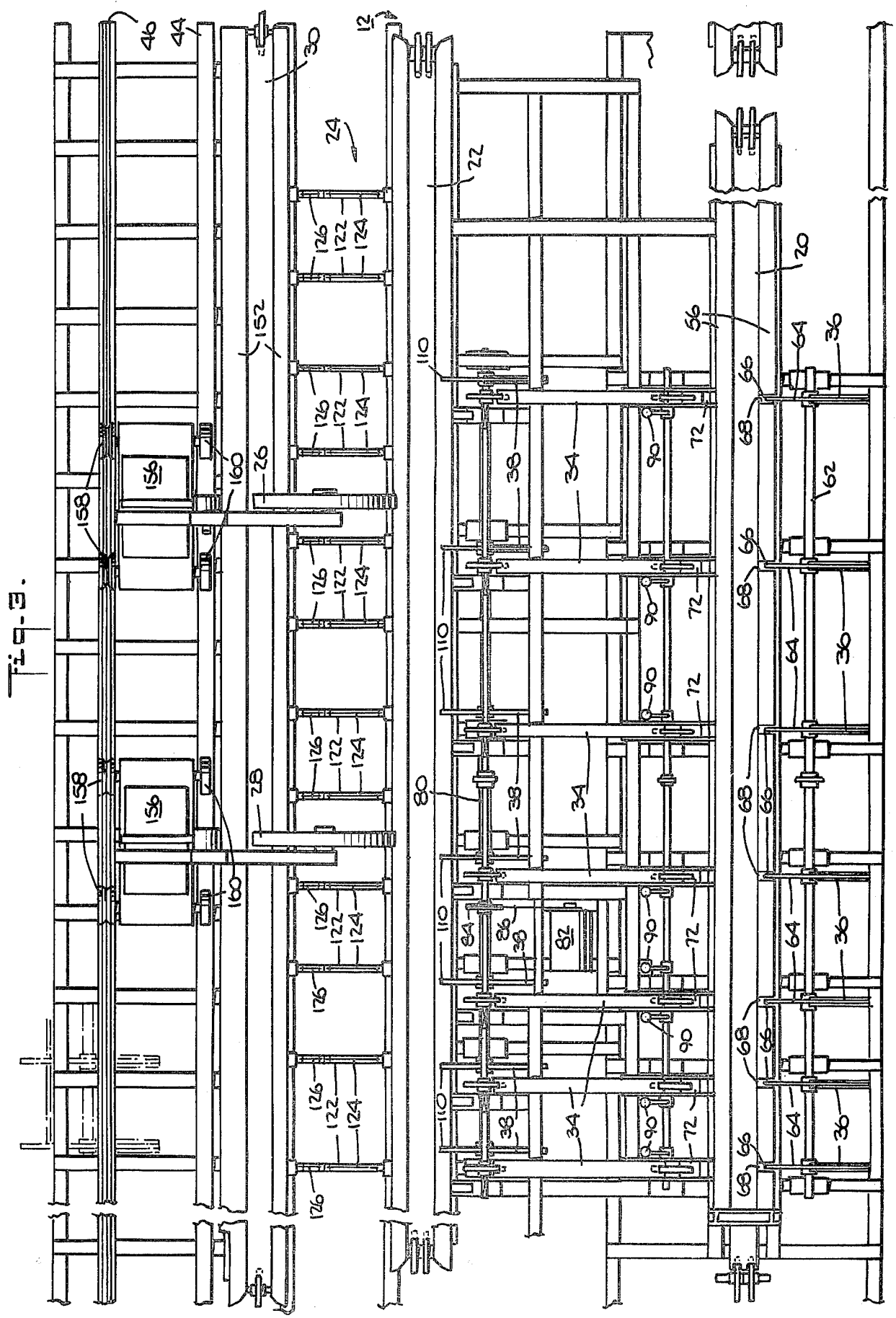

SMALL LOG BUCKING SYSTEM

BACKGROUND OF THE INVENTION

The present invention pertains generally to a system for bucking logs and pertains more particularly to a bucking system in which the optimal points at which to cut are determined automatically, with provision for the operator to override the cut locations chosen by the automatic system, and in which the cut-off segments are automatically singulated without a separate singulating step.

One of the first steps in processing timber after it has been stripped of branches is to buck it. The locations of the cuts should be chosen to maximize the profit that can be realized from the log. Since economics requires that logs be processed fairly quickly, it is easy for the human operator of a bucking station to make an error in determining the best locations for the cuts. Even a relatively small error can result in substantial wastage and a corresponding reduction of profit. Therefore, the locations of cuts should be determined by automatic means to the greatest extent possible.

Apparatus and methods for determining the size and shape of a log by automatic optical scanning means are known. One system for doing so is disclosed in U.S. Pat. No. 3,736,968, issued June 5, 1973, to Mason, for a "Method and Apparatus for Processing Logs," assigned to Sun Studs, Inc. Measurements made by means of such a system can be used to compute the optimum cut locations.

Logs of less than a certain diameter contain an approximately uniform concentration of knots and similar flaws. With relatively small diameter logs, therefore, it is possible to use a fully automatic scanning system for measuring the log, and to analyze the measurements by means of a computer to determine where to cut the log for maximum profit. In this manner, it is possible to eliminate human error in determining the optimum cut locations.

It is necessary to singulate the log segments output a bucking system, i.e., to separate them axially from one another. It is known, as disclosed for example in U.S. Pat. No. 3,812,951, issued May 28, 1974, to Fullaway, for a "Log Handling Apparatus," to singulate the log segments by receiving them, as they are cut off, in a special holding station, from which the operator releases them at appropriate times. It is desirable, in the interest of speed and economy, to eliminate the necessity for a separate singulating step and for special singulating equipment.

SUMMARY OF THE INVENTION

The principal object of the invention is to provide a small log bucking system that is as highly automated as possible.

It is another object of the invention to provide a small log bucking system in which each log is automatically scanned to determine the locations at which cuts should be made to maximize the profit that can be derived from the log, while allowing the operator of the system to override each such determination.

It is another object of the invention to provide a small log bucking system having at least two saws that are independently movable parallel to a log to be cut, so that two cuts can be made simultaneously at any locations on the log, and so that the position and orientation of the cuts can be more precisely controlled than is possible using a stationary saw.

It is a further object of the invention to provide a log bucking system in which each segment cut from the log can be removed from the cutting bed as soon as it has been cut, thus automatically singulating the log segments produced by the bucking apparatus, without a separate singulating device or singulation step.

It is still another object of the invention to provide a log bucking system including a device for automatically removing trims and similar waste from the cutting bed and transporting them to a chipper.

It is yet another object of the invention to provide a log bucking system in which the log is moved without significant loss of elevation.

According to the preferred embodiment of the present invention, a log is conveyed parallel to its axis past an optical scanning system which scans it to determine the exact size and shape of the log. A computer, preferably a dedicated minicomputer or a microprocessor, analyzes the information obtained by the scanning system and determines where the log should be cut to maximize the profit that can be realized from it.

An optical projection system projects light, preferably laser light, onto the log to indicate where the computer has determined cuts should be made. A cathode ray tube (CRT) display can also be used to indicate where the computer has calculated cuts should be made. The operator can override any proposed cut he disagrees with and can choose one or more cut locations himself. If the operator makes such changes, the computer recalculates the optimum locations for any cuts not specified by the operator and repositions the light projection system and changes the CRT display to indicate both the cut locations specified by the operator and those subsequently recalculated by the computer. This allows the operator to determine immediately whether his decision to override the computer's initial proposal is correct.

The log is then moved to the cutting bed. In the preferred embodiment, the cutting bed comprises three interleaved families of parallel vertical plates.

One family of plates is stationary and has notched upper edges that are aligned with each other to define a V-shaped trough in which the log is received.

The plates of the second family are located on the rear, or upstream, side of the trough and are vertically movable between a retracted position and a raised position in which they extend above the stationary plates.

The third set of vertically movable plates is also movable. These plates are interleaved with the stationary plates but are offset forward, or downstream, of the trough defined by the first set of plates. The plates of the third set each have an inclined upper edge parallel to the forward side of the trough, and are vertically movable between a retracted position and a raised position in which their inclined edges are coplanar with those of the stationary plates and form an extension of the forward side of the trough. When the third family of plates is raised and the second set is retracted, the third set of plates serves as a backstop to receive an incoming log. When both families of movable plates are raised, they define a second trough above and somewhat forward of the first trough. The second trough serves as the actual cutting bed.

The plates of the third set can be lowered independently of each other. As each segment of the log is sawn off, those of the third family of plates that support the cut-off segment are retracted, allowing the segment to roll from the cutting bed onto an output conveyor, which carries it immediately to the next work station. The segments are thus automatically singulated.

The log is moved from the input to the output end of the bucking station transversely to the log axis. This is done using elements having angled faces for engaging the log. This permits a log to be moved from one position to the next with relatively little variation in its elevation between its arrival at the bucking station and the transportation of the segments cut from it to the next work station. As a result no substantial time or power has to be expended in raising the logs to regain lost altitude, nor is it necessary to elevate the input end of the bucking station above the output end to allow the logs to proceed downhill from each position to the next.

Other objects and advantages of the invention will become clear from the following detailed description of the preferred embodiment, which is presented by way of illustration only and without limiting the scope of the invention to the details thereof.

BRIEF DESCRIPTION OF THE FIGURES

Throughout the figures, like elements are indicated by like reference characters.

FIG. 2 is a side elevational view of a preferred embodiment of a small log bucking system constructed in accordance with the invention.

FIG. 3 is a plan view of the bucking system of FIG. 2.

DETAILED DESCRIPTION OF THE PREFERRED EMBODIMENT

Figure 1:
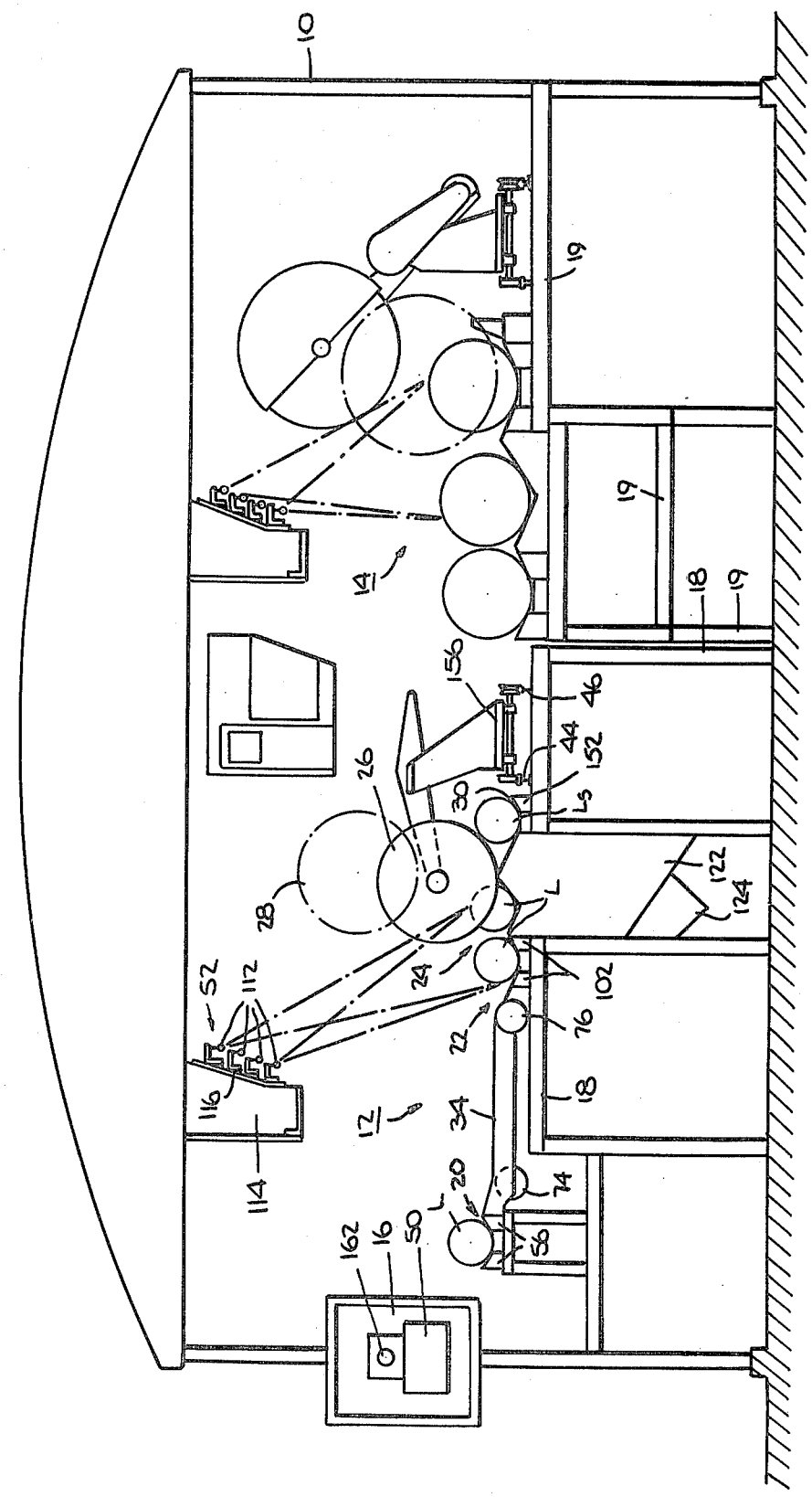
FIG. 1 is a schematic cross-sectional view of a saw building housing the bucking system of the invention.

FIG. 1 is a schematic cross-section of a saw building 10 containing the bucking system 12 of the present invention. It is contemplated that one building 10 will contain both a small log bucking system 12 and a large log bucking system 14. The large log bucking system 14 is preferably as described in the present inventors' copending application Ser. No. 387,659, entitled "Large Log Bucking System," filed 6/11/82, which is assigned in common with the present application and the disclosure of which is incorporated herein by reference.

A cab 16 for an operator is supported in the saw building 10 at a location from which it is possible for the operator to see the small bucking station 12 clearly. In the view shown, the cab 16 is located in one wall of the building 10.

The bucking stations 12, 14 are supported above the floor in saw building 10 by means of respective frames 18, 19.

The small log bucking system 12 of the invention includes an input conveyor 20, a second conveyor 22 used to align each log axially, a cutting bed 24, two traveling saws 26 and 28, an output conveyor 30 and a chipper conveyor 32, all mounted on frame 18. In addition, transfer chains 34 are provided to transport logs from the input conveyor 20 to the second conveyor 22, herein called the even-ending conveyor, together with first kickers 36 to load the log onto the transfer chains 34 from the input conveyor 20. A second set of kickers 38 is provided to move the log from the even-ending conveyor 22 to the cutting bed 24. Chutes 40 and 42 (see FIG. 2) are located beneath the cutting bed 24 and the saws, respectively, to catch trims and sawdust and to carry them to the chipper conveyor 32 to be transported to a chipper (not shown).

A conventional optical scanning system 48 (shown schematically in FIG. 2) is provided to scan each log as it arrives at the bucking station 12 to determine the size and shape of the log. A known scanning system suitable for use for this purpose is disclosed in U.S. Pat. No. 3,736,968, referred to above, issued June 5, 1973, to Mason for a "Method and Apparatus for Processing Logs", the disclosure of which is incorporated herein by reference.

The equipment for controlling the operation of the bucking station 12 includes a computer, which is preferably a dedicated minicomputer or a microcomputer. The operator's cab 16 contains a control panel 50 (indicated schematically) to permit him to control the computer for the purpose and in the manner described below. The computer calculates from the information obtained by the scanning system 48 the locations at which the log should be cut to maximize the profit that can be obtained from it and controls the operation of the bucking system 12. The transfer chains 34 are provided with lugs and index each log to the even-ending conveyor 22 while the length and diameter information about the log is stored in the computer memory.

A laser display system 52 is located above the transfer chains 34 to indicate, by projecting lights on a log on the even-ending conveyor 22, the location of cuts proposed by the computer. The operator visually inspects the log L and determines whether or not to override one or more of the proposed cuts. If he decides to override any of the cuts, he enters appropriate commands into the computer, which then recalculates the locations of the remaining cuts.

After the operator is satisfied with all of the proposed cut locations, the log is moved from the even-ending conveyor 22 to the cutting bed 24 by kickers 38. The log is then raised in the cutting bed 24 from the position in which it is initially received to a second, raised position, indicated in phantom at C in FIG. 2, in which it is cut by the traveling saws 26, 28 under the control of the computer. As each segment is cut off the log, the portion of the cutting bed structure 24 supporting the front or downstream side of the cut-off segment is lowered, allowing the cut-off segment $L_S$ to roll onto the output conveyor 30.

The output conveyor 30 is continuously in operation and carries each segment $L_S$ to the next work station as it is cut off. In this manner, the segments are automatically singulated without the need for a separate singulating station.

Saw dust and similar debris are removed from the bucking station 12 by means of chutes 40, 42, which direct them to the chipper conveyor 32 to be carried to a conventional chipper (not shown).

FIGS. 2 and 3 show the preferred embodiment of the small log bucking system 12 of the present invention in more detail.

THE SCANNING SYSTEM

The optical scanning system 48 is, as stated above, a conventional system that determines the size and shape of a log on the input conveyor 20 by such means as light sources and photocells, by measurements of the reflectivity of the log, etc. A system suitable for this purpose is disclosed in U.S. Pat. No. 3,736,968, referred to and incorporated herein by reference above.

THE INPUT AND ALIGNMENT SYSTEMS

The input conveyor 20 includes two parallel chain belts 54 spaced a small distance apart and disposed between two shoulders 56 which serve to retain incoming logs L on the input conveyor 20.

The first set of kickers 36, which is located at the tail end of the bucking station 12, is driven by a single hydraulic cylinder 58. Each kicker 36 comprises a kicker arm 64, one end 66 of which rests on but is not secured to the rear shoulder 56, lying in a slot 68 provided therein for it. The free end 66 of each kicker arm 64 is preferably serrated to grip the log L. The other end of one kicker arm 64 is pivotably attached to one corner of a generally triangular plate or quadrant 60, a second corner of which is pivotably attached to cylinder 58. The other end of cylinder 58 is secured to the foundation of the building 10. A horizontal rotatable shaft 62 supported by the frame 18 passes through an aperture provided for it at the third corner of the triangular plate 60, which is locked to the shaft 62 as by keying. The second end of each of the remaining kicker arms 64 is pivotably attached to a pair of flat bars 65 the other end of which is irrotatably secured to the shaft 62.

When the cylinder unit 58 is actuated to raise the quadrant 60, the pronged free ends 66 of the kicker arms 64 move to the operating position shown in phantom at 70, engaging a log L on the input conveyor 20 and forcing it over the forward shoulder 56 and onto inclined bars 72 that slope downward to the transfer chains 34.

The transfer chains 34 are endless belts of chain links. Each belt is borne by two sprockets 75, 76. The rear sprockets 74, with integral bushings, are mounted on stub shafts 78 which are supported by the chain races. The forward sprockets 76 are keyed in line on a single shaft 80, which is supported rotatably on the frame 18. An electric motor 82 is mounted on the frame 18 to drive the transfer chains 34 via a drive sprocket 84 secured to shaft 80 adjacent the motor 82, and a chain belt 86.

Each transfer chain 34 has a number of lugs or flights 88 secured to the link belt and extending outward therefrom in the plane of the belt's motion. The flights 88 engage logs delivered to the transfer chains 34, as shown in FIG. 2.

A retractable stop 90 is located near the tail end of each transfer chain 34. Each stop 90 comprises a rod 92 received slidably in a sleeve 94 secured to the chain races of the transfer chain 34. The lower end of each stop rod 92 is pivotably connected to a bell crank 93 via a connecting link 95. The bell crank 93 is actuated by a hydraulic cylinder 96 that is pivotably secured to the frame 18.

The purpose of the stops 90 is to prevent a log from rolling over one or more flights 88 on transfer chains 34. A log rolling over some but not all of a given line of flights 88 will be skewed, and a log rolling over a full set of flights 88 will no longer be indexed and will be lost to the computer. Further, a log striking the back of the flights 88 will cause the transfer chains 34 to slap and will transmit shock to the drive components.

When a log is kicked onto the transfer chains 34 by the kickers 36, cylinder 96 is actuated by the computer to raise the stops 90 into the path of the log, as indicated in phantom at 98 in FIG. 2. The log strikes the stops 90 and comes to rest. The computer 50 then causes the cylinder unit 96 to retract the stops 90 to allow the log to be transported to the even-ending conveyor 22.

Like the input conveyor 20, the even-ending conveyor 22 comprises two parallel chain belts 100 disposed between two shoulders 102. The upper surface of the rear shoulder 102 is coplanar with and abuts the forward edge of the upper surface of the supports 104 holding the transfer chain drive shaft 80, so that each log simply rolls from the transfer chains 34 onto the even-ending conveyor 22. Slots 106 are provided in the rear shoulder 102 to receive the pronged free ends 108 of the kicker arms 110 of the front, or downstream, kickers 38, which are for kicking each log from the even-ending conveyor 22 into the cutting bed 24. The structure and manner of operation of the kickers 38 are identical to those of the first kickers 36 and therefore will not be further described.

LASER DISPLAY SYSTEM

The laser display system 52 comprises a number of continuous-beam lasers 112 mounted horizontally above and forward of the even-ending conveyor 22 and the cutting bed 24, in such a position as to be able to project one or more beams of laser light on a log resting in either of these two locations. Preferably, the lasers 112 are mounted horizontally on a catwalk 114 whose forward side railing 116 is inclined forward and supports the lasers 112. Suitable conventional optics (not shown) are used to direct the output of each laser 112 in a direction transverse to the laser axis, toward a log on the even-ending conveyor 22 or on the cutting bed 24. The lasers 112 are preferably disposed in horizontal rows $118a \propto d$ parallel to the log axis, each row having at least two lasers 112. In the preferred embodiment, the top row $118a$ has three lasers 112, and the lower three rows $118b$-$d$ have two each. Any combination of the lasers 112 can be actuated simultaneously, so that as many as nine proposed cuts can be indicated at once.

Preferably, each laser 112 is slidably mounted on a respective horizontal rail 120 secured to catwalk railing 116 and is provided with a respective, independently controllable pneumatic cylinder (not shown) for moving the laser 112 along its rail 120. The computer 50 controls the movement and actuation of each laser 112.

CUTTING BED AND SINGULATING SYSTEM

The cutting bed 24 is defined by three families of parallel vertical plates 122, 124, 126. The plates 122 of the first set are stationary, and are supported parallel to each other by the frame 18. Each stationary plate 122 has two flanges 128 resting on and secured to the frame 18. The rear flanges 128 abut the forward shoulder 102 of the even-ending conveyor 22 and define a surface coplanar with the upper shoulder surface. The upper surfaces of the stationary plates 122 define a V-shaped trough 130.

The second family of plates 124 of the cutting bed 24 is movable. Each plate 124 is pivotably secured to one end of a connector rod 132 whose other end is pivotably secured to a respective equalizer arm 136. The other ends of the equalizer arms 136 are keyed in line to a common shaft 140. A hydraulic cylinder 134 mounted on the foundation is controlled by the computer 50 to raise and lower the plates 124 between the retracted position shown in FIG. 2 and a raised position 142, shown in phantom.

Each plate 126 of the third family is vertically movable between a retracted position, shown in FIG. 2, and a raised position 144, shown in phantom, by means of a pneumatic or hydraulic cylinder 146 pivotably secured to the plate 126 and to the frame 18.

The forward and rear edges of the movable plates 124, 126 are slidably received in guideways defined by stationary plates 122 and are provided with replaceable low-friction wear strips 148 along their forward and rear edges.

When the second and third sets of plates 124, 126 are in their raised positions 142, 144, they define a second trough having the same shape as that defined by the stationary plates 122, but spaced forward (downstream) of and above the latter trough 130.

When a log L is kicked from the even-ending conveyor 22, the second family of plates 124 is in the retracted position, as shown, and the third family of plates 126 is in the raised position 144 to serve as a backstop. The log L is kicked off the even-ending conveyor 22, and rolls up the shoulder 102 and the upper edge of the rear flanges 128, then down into the V-shaped trough 130 defined by the stationary plates 122. After the log has been received in the trough 130, the rear movable plates 124 are raised, elevating the log to the position indicated in phantom at C.

The log is cut while elevated, the saws 26, 28 swiveling downward to make the cuts (saw 26 being shown in FIG. 2 as it finishes a cut) and being raised again after completing the cut (saw 28).

According to the invention, the plates 128 of the third set are movable independently of each other. As a result, it is possible to release each log segment as it is cut from the log by lowering those of the third set of plates 126 that support the cut-off portion. As each segment of the log is cut off by saw 26 or saw 28, the forward movable plates 126 which lie under the cut-off segment are lowered, while the rear movable plates 124 and the remaining forward plates 126 are kept in their elevated positions. As can be seen from FIG. 2, this allows the cut-off segment to roll onto the output conveyor 30 to be carried to the next work station.

The segments are carried away by the output conveyor 30 one at a time. When the last cut is made, the proper spacing between the two resulting segments can be obtained by releasing one a short time after the other, rather than simultaneously. Thus no special equipment or step is necessary to singulate the stream of log segments produced by the bucking station.

OUTPUT CONVEYOR

The output conveyor 30, which is located immediately forward of the cutting bed 24, comprises a single strand of chain 150 with flights at regular intervals and is disposed between two shoulders 152. The forward shoulder 152 is provided with a high bank 154 to ensure that no log segment released from the cutting bed 24 accidentally overshoots the output conveyor 30. The top surface of the rear shoulder 152 abuts, and is coplanar with, the top edge of the forward flanges 128 of the stationary plates 122 to enable the logs released from the cutting bed 24 to roll smoothly onto the output conveyor 30.

THE SAWS

Two traveling saws 26 and 28 are mounted on rails 44, 46 behind and parallel to the output conveyor 30. Each saw 26, 28 is mounted on a separate wheeled carriage 156 that can be moved along the rails 44, 46 independently of the other. Each saw carriage 156 has a log hold-down (not shown) controlled by the computer to clamp the log in position before each cut and releasing it after each cut. Each carriage 156 also has two rail clamps (not shown) that prevent the carriage 156 from moving along the rails 44, 46 or tipping during sawing. The rear rail 44 has a flat upper surface, while the forward rail 46 is narrower at its top than at its base. The wheels 158 riding on rail 46 have recessed rims that grip the rail 46, while the wheels 160 riding on rail 44 have flat rims.

Motors (not shown) under the control of the computer move each saw 26, 28 along the rails 44, 46 independently of each other, the independence of the saws 26, 28 being limited only by the fact that neither saw can pass the other. The saws can also be raised and lowered independently of each other. As a result, not only can two cuts be made simultaneously at almost any two points along the length of the log (the bulk of the saw carriages prevents the saws from being positioned more than a minimum distance apart, but this limitation is insignificant in practice, since rarely, if ever, would two cuts need to be made so close together simultaneously), but if one cut is completed before the other, the saw that has finished its cut can be moved immediately to another location to begin another cut.

In addition to this increase in efficiency, the use of traveling saws permits logs to be bucked with a degree of accuracy that cannot be obtained with a system employing a stationary saw and in which the log is moved axially to position it for each cut.

THE CHIPPER CONVEYOR

The chipper conveyor 32 is conventional in construction, generally resembling the three conveyors already described, except that the chipper conveyor 32 lacks shoulders. A first chute 40 is provided beneath the cutting bed 24. When a trim is cut from the end of a log, it falls between the plates 122, 124, 126 defining the cutting bed 24 onto the chute 40, which carries it to the chipper conveyor 32 for transport to the chipper (not shown). Similarly, a second chute 42 is provided beneath the saws 26, 28, and serves to transport sawdust, small chips and similar debris produced by the sawing to the chipper conveyor 32 for disposal.

THE CONTROL SYSTEM

The control computer is preferably reprogrammable, so that the formulas used to calculate the optimum cut locations can be modified, if necessary, to reflect fluctuations in the relative values of the different types of product that can be obtained from a small log. As already noted, the computer preferably also is provided with a cathode ray tube (CRT) 162 or other display device that indicates to the operator where the computer has calculated the log should be cut. If the operator overrides any cut locations proposed by the computer, the CRT 162 indicates the locations selected by the operator, and any cuts not specified by the operator and subsequently recalculated by the computer.

THE OPERATION OF THE BUCKING SYSTEM

The operation of the bucking system 12 of the invention will now be described.

A log is brought to the bucking system 12 by the input conveyor 20. As the log passes the optical scanning system 48, it is scanned. The log is halted by the stop at the end of the input conveyor 20. The log is then kicked off the input conveyor 20 by the first kickers 36, and rolls onto the transfer chains 34.

As the first kickers 36 are actuated, the computer 50 causes the retractable stops 90 to be extended into the path of the log. The log is halted by the protruding stops 90, and the computer causes the stops 90 to be retracted. The movement of the transfer chains 34 brings the next line of flights 88 into abutment against the log, and moves the log toward the even-ending conveyor 22.

When the log reaches the forward end of the transfer chains 34, it rolls onto the even-ending conveyor 22. When it has come to rest on even-ending conveyor 22, its axial position is adjusted, if necessary, by movement of the conveyor 22 to ensure that none of the cut locations will lie directly on any of the lift plates 124, 126 that define the cutting bed, since the saw blade descends to a point below the upper extremities of elevated plates 124 and 126. This alignment operation is performed under the control of the computer.

Once the log has been properly aligned, the computer causes a laser 112 of the laser display unit 52 to project a beam of light onto the log at each cut location determined by the computer. This allows the operator to inspect the decision made by the computer and to override it should he disagree with it. To override the computer, the operator enters commands into the computer control panel 50 specifying which proposed cut or cuts are to be changed and indicating the proper location thereof. The computer recomputes the cut locations, taking into account the commands entered by the operator. The computer then displays the recalculated cuts for the operator's approval. If he now approves of all the proposed cuts, he enters a command to enable the computer to proceed with the execution of its program. The computer then actuates the second kickers 38, which eject the log from the even-ending conveyor 22 and onto the cutting bed 24.

The forward lift plates 126 are raised under the control of the computer before the log is kicked from the even-ending conveyor 22. After the log is received in the trough 130 defined by stationary plates 122, the rear set of lift plates 124 is raised, elevating the log to the cutting position C. The computer then actuates the traveling saws 26 and 28, each of which is moved to the axial location of a proposed cut and cuts the log.

As the jagged or broken ends of the log are cut off, they fall between the vertical plates 122, 124, 126 defining the cutting bed 24 and onto the trim chute 40, which carries them to the chipper conveyor 32. They are taken by the chipper conveyor 22 to a chipper (not shown) to be converted into chips for the manufacture of pulp or the like.

As each cut is finished, the cut-off segment (if it is not a trim) is removed from the cutting bed 24 immediately. This is done by lowering those of the forward lift plates 126 which support the segment, allowing it to roll down shoulder 152 onto the output conveyor 30. The output conveyor 30 is continuously in motion and thus immediately carries each cut-off segment to the next work station. Since each segment strikes the output conveyor 30 at a different time, the segments are automatically singulated, and no additional equipment or step is required for this purpose.

Each log segment is bucked for a specific purpose and destination, and the computer according routes each segment to the appropriate destination.

It will now be fully appreciated that the bucking system of the present invention provides the advantages of faster and more accurately located cuts, by virtue of having two independently controllable traveling saws 26, 28, and permits the automatic singulation of the output stream of log segments. In addition, trims, sawdust and other detritus are automatically removed by the chipper conveyor 32. A high degree of automation is achieved, since each log is automatically scanned as it arrives at the bucking station, and the computer automatically determines where the cuts should be made to maximize the profit that can be obtained from each log. The cuts proposed by the computer for each log are displayed on the log by the laser display system 52 for the inspection and approval of the operator. If he disapproves of any of the cuts, he can override it, in which case the computer automatically recalculates the optimum location of the remaining cuts. In this manner, the calculations of the optimum cuts locations are carried out automatically, saving the operator from the necessity of making a long series of difficult judgments quickly and without the benefit of precise measurements. Since the operator does not have to concentrate solely on making a series of quick decisions based on a voluminous stream of information, he is able to consider the proposed cuts at a relatively leisurely pace, lessening the chance of poor judgment or error on his part. As a result, the maximum number of logs can be cut in the optimum manner with maximum speed and accuracy.

Although the present invention has been described in detail with reference to one preferred embodiment thereof, it will be clearly understood that this is by way of illustration only. Many variations and alternative embodiments of the invention will now be apparent to those skilled in the art, and are not to be excluded from the scope of the invention, which is to be determined only by the appended claims.

What is claimed is:

1. A log bucking system, comprising:
    cutting bed means for supporting a log to be cut;
    saw means for cutting a log supported by said cutting bed means;
    input means for moving a log to said cutting bed means to be cut; and
    output means for transporting log segments cut by said saw means away from said cutting bed means; said cutting bed means comprising stationary means defining a first trough for receiving a log from said input means and first and second movable means that are movable between a retracted and a raised position, and that cooperate, when at said raised position, to define a second trough at an elevated cutting position; said second movable means comprising a plurality of means for supporting different portions of the length of a log, each said supporting means being lowerable, independently of the other said supporting means to cause a log segment cut from a log and supported by at least one said supporting means to move from said elevated cutting position onto said output means, while the remainder of the log is retained at said elevated cutting position, in such a manner that the log segments are spaced at least a predetermined distance apart on said conveyor means, thereby singulating the log segments.

2. The bucking system of claim 1, wherein each said supporting means comprises a vertically movable plate having an inclined portion for supporting a log at said elevated position in cooperation with the other said supporting means and with said first movable means, and means for raising and lowering each said plate independently of the other said plates.

3. The bucking system of claim 2, wherein said first movable means and said stationary means each comprise a plurality of parallel vertical plates interleaved with said plates of said second movable means to allow trims cut from a log supported in said cutting bed to fall between said plates for removal from said bucking system.

4. The bucking system of claim 3, further comprising a chipper conveyor for transporting trims away from said bucking system, and chute means for directing trims that have fallen between said plates to said chipper conveyor.

5. The bucking system of claim 4, further comprising second chute means for directing sawdust from said saw means to said chipper conveyor.

6. The bucking system of claim 1, further comprising scanning means for scanning a log for determining its size and shape.

7. The bucking system of claim 6, further comprising computing means for calculating the optimum locations at which to cut a log as a function of the size and shape thereof.

8. The bucking system of claim 7, wherein said computing means is further for controlling the operation of said input means, said cutting bed means, said saw means and said output means.

9. The bucking system of claim 7, further comprising display means for projecting light on a log at a location selected by said computing means for a cut.

10. The bucking system of claim 9, wherein said display means comprises a plurality of n lasers, n being a natural number greater than 1, for projecting light at up to n locations on a log simultaneously.

11. The bucking system of claim 10, wherein each said laser is movable parallel to the axis of a log supported in said cutting bed, for varying the location at which each said laser projects light on the log.

* * * * *